UNITED STATES PATENT OFFICE.

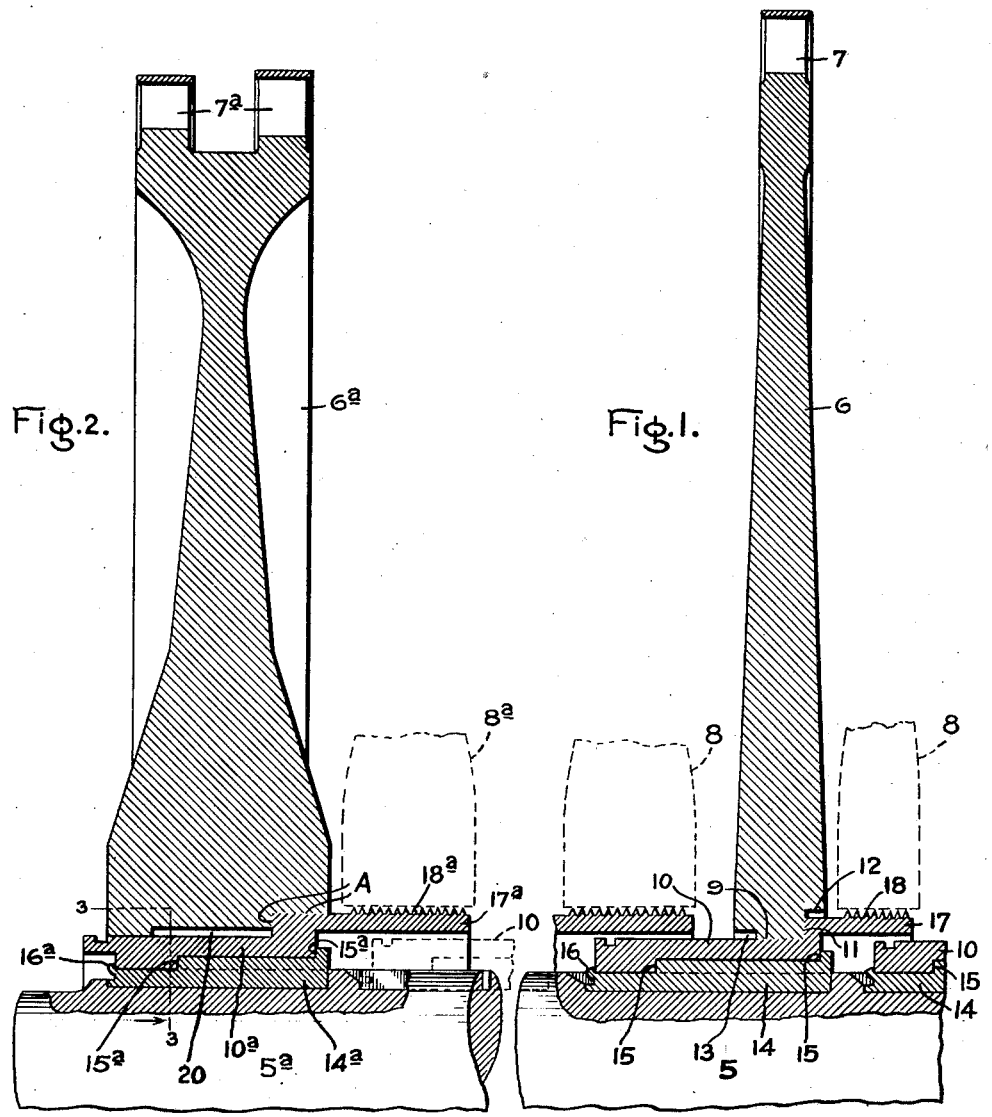

WILLIAM L. R. EMMET, OF SCHENECTADY, NEW YORK, ASSIGNOR TO GENERAL ELECTRIC COMPANY, A CORPORATION OF NEW YORK.

ELASTIC-FLUID TURBINE.

1,362,405.   Specification of Letters Patent.   Patented Dec. 14, 1920.

Application filed May 11, 1920. Serial No. 380,533.

*To all whom it may concern:*

Be it known that I, WILLIAM L. M. EMMET, a citizen of the United States, residing at Schenectady, county of Schenectady, State of New York, have invented certain new and useful Improvements in Elastic-Fluid Turbines, of which the following is a specification.

The present invention relates to elastic-fluid turbines, and particularly to turbines of the type comprising a plurality of disks or wheels mounted on the shaft and carrying suitable buckets upon the periphery. With such turbines it is important that the disks or wheels be made as light as possible in order to reduce the weight of the machine thereby reducing its size. In addition, by making the disks or wheels as thin as possible, particularly at the hubs where the greatest stresses occur, the distance between the bearings may be reduced, or a larger number of stages may be put in in the same distance. On the other hand, it is essential to obtain a rigid construction which will withstand not only the stresses set up due to centrifugal action but also those which occur due to the substantial temperature changes which are continuously going on in the turbine due to changes in load and variations in the vacuum. If the turbine wheel or disk is rigidly fastened to the shaft these latter strains, due to temperature changes, are very large, particularly in the hubs, on account of the wheels or disks responding much more quickly to temperature changes than the heavy shaft, and with this arrangement, relatively heavy wheels, having strong hubs, are required as otherwise the wheels, if made too thin and light, will distort and possibly loosen on the shaft.

In this connection, it has already been proposed to fasten or connect a wheel to the shaft in such manner that it is free to respond to temperature changes independently of the shaft, whereby strains due to temperature changes are practically eliminated which permits of the wheel or disk being made much lighter and thinner than before, and the object of my present invention is to provide an improved structure and arrangement in a fastening or connecting means of this character.

In the drawing, Figure 1 is a radial sectional view of a part of a turbine wheel fastened to a shaft in accordance with my invention; Fig. 2 is a similar view of a modification; Fig. 3 is a section taken on the line 3—3 of Fig. 2, and Fig. 4 is a perspective view of a key common to both forms of the invention.

Referring to the drawing, Fig. 1, 5 indicates a shaft and 6 a turbine wheel mounted thereon and carrying the usual ring or rings of buckets 7. Only a single wheel is shown in Fig. 1 but it will be understood that a complete turbine comprises a number of such wheels spaced along the shaft with diaphragms between them, which diaphragms divide the turbine into stages and contain nozzles for directing the elastic fluid from the buckets of one stage to the buckets of the next stage. In Fig. 1 diaphragms, one on each side of wheel 6, are indicated by the dotted lines at 8.

According to my invention, I provide wheel 6 with a bore 9 of greater diameter than the shaft and attach the wheel to the shaft through the intermediary of a ring or hub 10 of suitable length which is shrunk on the shaft and keyed thereto and to which the wheel is fastened at one end of the ring only. In Fig. 1, ring or hub 10 is of substantially greater length than the width of the wheel and is provided with a shoulder 11 at one end with which the side of wheel 6 engages. Wheel 6 is thus located at one end of ring or hub 10 and the bore of the wheel may be cut away as indicated at 12 and 13 so the wheel is in engagement with ring or hub 10 over a limited area. The wheel is rigidly fixed to the one end of ring or hub 10, preferably by fusion of metal, such as by brazing, welding or the like whereby the wheel becomes practically an integral part of one end of the ring or hub. In Fig. 4 I have shown a perspective view of a key 14 well adapted for fastening ring or hub 10 to the shaft, the same being provided with shoulders 15 and a slot in its end forming a lip 16 adapted to be peened up against the end of ring or hub 10 as shown in Fig. 1. As many keys 14 may be used as found desirable; for example, I may use two located on opposite sides of the shaft.

Formed integral with ring or hub 10 is a sleeve 17 having annular teeth 18 on its outer surface which pack against the bore of diaphragm 8 to form a diaphragm packing to prevent leakage between the bore of the diaphragm and the shaft. The next adjacent ring or hub 10 projects beneath sleeve 17 and such sleeve forms a shield for it and for the shaft to protect them from sudden changes in the temperature of the elastic fluid. This arrangement also serves to make the structure compact; that is, it makes the axial length of the machine a minimum.

In manufacture, the bore of the wheel and the outside surface of ring or hub 10 are turned to the desired dimensions and the wheel is then put on the hub 10 with a good tight fit after which they are fastened together by fusion of metal as already referred to. This makes the hub 10, in substance, an integral part of wheel 6, and the two can then be machined together to give them the proper shape and dimensions. The shaft is provided with key ways for keys 14 and such keys are placed therein after which the wheel and hub are shrunk on the shaft and keys to give a tight fit therewith.

With the foregoing arrangement, in case of sudden heating of wheel 6 to such an extent as to set up abnormal stresses so as to cause it to pull away from the shaft, it will pull with it the one end of ring or hub 10 and may pull such end free of the shaft. The other end, however, will remain tight on the shaft and serve to hold the wheel to the shaft and transmit the torque.

In Fig. 2 I have shown my invention applied to a turbine wheel 6ª carrying two rings of buckets 7ª, such a wheel being well adapted to form the first stage wheel of a multistage turbine. In this case the wheel at its bore is quite wide, being shown as of substantially the same width as ring or hub 10ª. The wheel and hub 10ª are integrally fastened to each other, as by fusion of metal, at the right-hand end of hub 10ª along the contacting surfaces indicated at A. At the other edge wheel 6ª contacts with hub 10ª but is not rigidly fixed thereto, while intermediate the two edges of the wheel, the wheel and ring are not in engagement with each other, being separated by annular space 20. The arrangement shown in Fig. 2 is in substance the same as that shown in Fig. 1 and acts in the same manner under heat changes.

In Fig. 2, corresponding parts are indicated by the same reference numerals as those used in Fig. 1 with the exponent $a$ added.

With my improved arrangement, it will be seen that the wheel and hub after they are united are in substance one integral structure and they are shrunk on the shaft with a fit sufficiently tight so that under normal operating conditions, and with normal stresses the wheel will be held rigidly connected to the shaft. In case of abnormal stresses in the wheel it may, as already explained, pull away from the shaft slightly, pulling with it the one end of the hub or ring. The other end of the hub or ring will remain rigid with the shaft, holding the wheel centered and transmitting the torque.

Since the ring or hub has a comparatively large surface in engagement with shaft 5, so the transfer of heat from it to the shaft is comparatively rapid, and since it is protected by the surrounding packing sleeve, it will not be likely to be heated so rapidly that it will be caused to heat up faster than the shaft and loosen thereon. The wheel being in engagement with the hub or ring over a comparatively small area, the transfer of heat from the wheel to the ring will be slow as compared to the transfer of heat from the ring or hub into the shaft. The ring or hub can therefore quickly dissipate the heat transferred from the wheel to it into the shaft and its temperature will vary but little from that of the shaft.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In an elastic-fluid turbine, a shaft, a ring shrunk throughout its length on the shaft, and a wheel on said ring and integrally connected to the ring at one end of the ring.

2. In an elastic-fluid turbine, a shaft, a wheel, and a ring which extends through the bore of the wheel and is attached thereto at one end by fusion of metal, said ring with the wheel thus attached being shrunk throughout its length on the shaft.

3. In an elastic-fluid turbine, a shaft, a wheel, and a ring which extends through the bore of the wheel and is attached thereto at one end by fusion of metal, said ring with the wheel thus attached being shrunk throughout its length on the shaft, and a sleeve carried by the ring and provided with diaphragm packing means thereon.

4. In an elastic-fluid turbine, a shaft, a wheel, and a ring which extends through the bore of the wheel and is attached thereto at one end by fusion of metal, said ring with the wheel thus attached being shrunk on the shaft, and a sleeve carried by the ring and provided with diaphragm packing means thereon, said sleeve overlapping the ring of the next adjacent turbine wheel.

5. In an elastic-fluid turbine, a shaft, a ring shrunk throughout its length on the shaft, and a wheel on the ring, which wheel is integrally attached to one end of the ring over a comparatively small surface area of the ring.

In witness whereof, I have hereunto set my hand this 10th day of May, 1920.

WILLIAM L. R. EMMET.